(12) United States Patent
Sun et al.

(10) Patent No.: US 12,273,416 B1
(45) Date of Patent: Apr. 8, 2025

(54) SENSING FUNCTION CONTROL NODE FOR INTERNET OF THINGS

(71) Applicant: NANJING XIGUANG RESEARCH INSTITUTE FOR INFORMATION TECHNOLOGY CO., LTD, Suzhou (CN)

(72) Inventors: Xiaohan Sun, Suzhou (CN); Xiaokai Ye, Suzhou (CN); Kun Huang, Suzhou (CN); Tao Lyu, Suzhou (CN); Jun Zhao, Suzhou (CN); Qiugun Miao, Suzhou (CN); Jinhui Li, Suzhou (CN); Xuekang Shan, Suzhou (CN)

(73) Assignee: NANJING XIGUANG RESEARCH INSTITUTE FOR INFORMATION TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 18/574,038

(22) PCT Filed: Aug. 18, 2022

(86) PCT No.: PCT/CN2022/113260
§ 371 (c)(1),
(2) Date: Dec. 24, 2023

(87) PCT Pub. No.: WO2024/021196
PCT Pub. Date: Feb. 1, 2024

(30) Foreign Application Priority Data

Jul. 25, 2022 (CN) .......................... 202210877595.3

(51) Int. Cl.
*H04W 4/38* (2018.01)
*G16Y 10/75* (2020.01)
(Continued)

(52) U.S. Cl.
CPC .............. *H04L 67/12* (2013.01); *G16Y 10/75* (2020.01); *G16Y 20/20* (2020.01); *G16Y 40/20* (2020.01); *G16Y 40/35* (2020.01); *H04L 47/25* (2013.01)

(58) Field of Classification Search
None
See application file for complete search history.

(56) References Cited

U.S. PATENT DOCUMENTS

2017/0155695 A1* 6/2017 Wei .......................... H04L 67/06
2017/0317891 A1* 11/2017 Ma ............................ H04B 1/38
2019/0239048 A1* 8/2019 Nuttall .................... H04L 67/34

FOREIGN PATENT DOCUMENTS

CN          204697112 U  * 10/2015
CN          109617947 A  *  4/2019
                (Continued)

OTHER PUBLICATIONS

"International Search Report (Form PCT/ISA/210) of PCT/CN2022/113260", mailed on Apr. 7, 2023, pp. 1-3.
(Continued)

*Primary Examiner* — Christopher B Robinson
(74) *Attorney, Agent, or Firm* — JCIPRNET

(57) ABSTRACT

The present disclosure discloses a sensing function control node for an Internet of Things (IoT), and relates to technical field of electrical communication. The node includes an accessing module for sensors and actuators, a data format analyzing and integrating module and a transmission accessing and connecting module. Software-defined optical access technologies are utilized to control original sensing data in the IoT to access the accessing module for the sensors and the actuators. Status information of modules in the node is sensed in real time through a software-defined unified control plane, to adjust upload rates of modules and control the connections between sensing function control node and (Continued)

EAN. The original sensing data in IoT are transmitted to the transmission accessing and connecting module after being pre-processed. The pre-processed data are transmitted to EAN through upload channels between the sensing function control node and EAN established.

9 Claims, 2 Drawing Sheets

(51) Int. Cl.
*G16Y 20/20* (2020.01)
*G16Y 30/00* (2020.01)
*G16Y 40/20* (2020.01)
*G16Y 40/35* (2020.01)
*H04L 47/25* (2022.01)
*H04L 67/12* (2022.01)

(56) References Cited

FOREIGN PATENT DOCUMENTS

| | | | |
|---|---|---|---|
| CN | 109862011 | | 6/2019 |
| CN | 109933023 A | * | 6/2019 |
| CN | 112867020 | | 5/2021 |
| CN | 114189856 A | * | 3/2022 ............ H04W 12/03 |
| IN | 201741044901 A | * | 3/2019 |

OTHER PUBLICATIONS

"Written Opinion of the International Searching Authority (Form PCT/ISA/237) of PCT/CN2022/113260", mailed on Apr. 7, 2023, pp. 1-3.

Office Action of China Counterpart Application, with English translation thereof, issued on Oct. 12, 2023, pp. 1-7.

* cited by examiner

SENSING FUNCTION CONTROL NODE FOR INTERNET OF THINGS

CROSS-REFERENCE TO RELATED APPLICATION

This application is a 371 of international application of PCT application serial no. PCT/CN2022/113260, filed on Aug. 18, 2022, which claims the priority benefit of China application no. 202210877595.3, filed on Jul. 25, 2022. The entirety of each of the above-mentioned patent applications is hereby incorporated by reference herein and made a part of this specification.

TECHNICAL FIELD

The present disclosure discloses a sensing function control node for an Internet of Things, which relates to the Internet of Things optical access technology, and belongs to the technical field of electrical communication.

BACKGROUND

With developments of the Internet of Things (IoT), a large amount of data are generated in inherent things in our daily life, and a plurality of schemes are deployed at edges to process these data. Until 2023, nearly 50% of data created by the Internet of Things come from home interconnected applications, and these data need to be aggregated, mined, processed and stored near or at the edges of the network through the edge compute node (ECN). Although the software-defined optical access technology has provided a lot of help for developments of the Internet of Things because the software defined optical access technology is equipped with characteristics, such as centralized control, resource virtualization and business service, a core layer switching node based on a traditional networking architecture faces huge data pressures generated by a convergence of a large amount of multi-source heterogeneous data in an Internet of Things accessing layer.

One of most effective solutions to alleviate data pressures is to pre-process sensing data at a physical layer of the Internet of Things, and then transmit the data to the edge access node (EAN) at a network layer through an accessing control. Therefore, it is necessary to design a node with a control function for the sensing data in a physical layer. The present disclosure aims to propose a sensing function node (SFN) for the Internet of Things, which can pre-process original sensing data sensed by the sensor in a physical layer, in order to achieve effects that the Internet of Things accessing layer can access and aggregate the data at the physical layer more efficiently and quickly, thereby reducing pressures of aggregation, mining, processing, and storage of the sensing data in edges of the Internet of Things.

SUMMARY

In view of the deficiencies of the above background technology, the objectives of the present disclosure provide a sensing function control node for an Internet of Things, which pre-process the data sensed by the sensors at the physical layer, and control whether the original sensing data are transmitted to the corresponding EAN for edge compute (EC). To achieve the objectives of effectively reducing the pressure of aggregation, mining, processing and storage of the data in the edge layer of the Internet of Things, and solve the technical problems of heavy data pressures at EAN of the Internet of Things.

In order to achieve the above objectives, the present disclosure adopts following technical solutions:

Provided is a sensing function control node for an Internet of Things that conducts pre-processing and transmitting controls to the original sensing data collected by the sensors of the Internet of Things. The sensors and the actuators of the Internet of Things are connected to SFN through a wired link or a wireless link, and SFN pre-processes the data uploaded by the Internet of Things and then uploads the data to EAN through wired or wireless connections.

The sensing function control node for an Internet of Things includes: an accessing module for sensors and actuators, a data format analyzing and integrating module, and a transmission accessing and connecting module.

The accessing module for the sensors and the actuators is configured to upload the data from the Internet of Things sensors and/or actuators to the data format analyzing and integrating module. In a case where the sensors and the actuators of the Internet of Things are connected to the SFN, the sensors and actuators connected to the SFN upload data to the accessing module for the sensors and the actuators. According to the received upload rate control information of the accessing module for the sensors and the actuators, the rate for uploading the data to the data format analyzing and integrating module is increased or decreased. The accessing function of the sensors and actuators of the Internet of Things connecting to SFN, as well as the adjusting function of the upload rate of the accessing module for the sensors and the actuators are implemented by the software-defined unified control plane.

The data format analyzing and integrating module pre-processes the data uploaded by the accessing module for the sensors and the actuators, including data analysis and format integration. According to the received upload rate control information of the data format analyzing and integrating module, the rate for uploading the pre-processed data to the transmission accessing and connecting module is increased or decreased. The adjusting function of the upload rate of the data format analyzing and integrating module is implemented by the software-defined unified control plane.

The transmission accessing and connecting module is configured to establish upload channels between SFN and EAN. After receiving control information of increasing or decreasing the number of the transmitting channels between SFN and EAN, the upload channels are increased or decreased and the pre-processed data are uploaded to EAN according to the received upload rate control information of the transmission accessing and connecting module. The adjusting function of the upload rate of the transmission accessing and connecting module, as well as the adjusting function of the number of upload channels opened in the transmission accessing and connecting module are implemented by the software-defined unified control plane.

The software-defined unified control plane includes the assessing control module for the sensors and the actuators, the sensing resource control module as well as the transmission accessing control module. The accessing control module for the sensors and the actuators, the sensing resource control module as well as the transmission accessing control module interact with the accessing module for the sensors and the actuators, the data format analyzing and integrating module and the transmission accessing module in SFN via a control channel $\lambda_{ctrl}$ for the information of the data amount to be uploaded of modules, the channel rate information of modules, the upload rate control information of modules, and the transmitting channel control information between SFN and EAN.

The assessing control module for the sensors and the actuators transmits an assessing control instruction to the sensors and the actuators on the physical layer, transmits sensed information of the data amount to be uploaded and the channel rate information of the assessing module for the sensors and the actuators to the sensing resource control module, forwards the upload rate control information of the accessing module for the sensors and the actuators generated by the sensing resource control module to the accessing module for the sensors and the actuators. The accessing control instruction is configured to control whether the data of the sensors and the actuators in the Internet of Things are uploaded to the accessing module for the sensors and the actuators. Merely the sensors are allowed to access by the accessing control instructions, such that the original sensing data in the sensors that are allowed to access can be uploaded to SFN for data analysis and format integration without being processed. The sensors and the actuators are allowed to access simultaneously by the accessing control instructions, such that the accessing control instruction needs to contain whether the original sensing data of the sensors that are allowed to access need to be processed by the actuators and the specific processing methods. The original sensing data of the sensors that need to be processed by the actuators are uploaded to SFN for data analysis and format integration after being processed through the specific processing methods, wherein the specific methods are determined according to different access network requirements. The original sensing data of the sensors that do not need to be processed by the actuators are uploaded directly to SFN for data analysis and format integration.

The sensing resource control module is configured to sense the status information of the accessing module for the sensors and the actuators, the data format analyzing and integrating module and the transmission accessing and connecting module, the status information includes the data amount to be uploaded and the channel rate. According to sensed status information of modules, the load status of SFN is determined, and the upload rate control information of modules in SFN as well as the transmitting channel control information between SFN and EAN are generated. In a case where the sensing resource control module determines that SFN has relatively low loads according to the status information of modules in SFN, the sensing resource control module generates the control information for increasing the upload rate of modules in SFN, or generates the control information for reducing the number of transmitting channels between SFN and EAN. In a case where the sensing resource control module determines that SFN is fully loaded or over loaded according to the status information of modules in SFN, the sensing resource control module generates the control information for decreasing the upload rate of modules in SFN, or generates the control information for increasing the transmitting channels between SFN and EAN. The sensing resource control module senses the data amount to be uploaded and the channel rate of the data format analyzing and integrating module through the control channels, and collects the data amount to be uploaded and the channel rate of the accessing module for the sensors and the actuators, as well as the data amount to be uploaded and the channel rate of the transmission accessing and connecting module, and respectively transmits the upload rate control information of the accessing module for the sensors and the actuators as well as the upload rate control information of the transmission accessing and connecting module to the accessing control module for the sensors and the actuators as well as the transmission accessing and connecting module. According to collected upload rate control information, the accessing control module for the sensors and the actuators transmits the upload rate control information of the accessing module for the sensors and the actuators to the accessing module for the sensors and the actuators through the control channels, and the transmission accessing control module transmits the upload rate control information of the transmission accessing and connecting module and the transmitting channel control information between SAN and EAN through the control channels to the transmission accessing and connecting module. The criterion for determining that SFN has relatively low loads is that none transmission rates of the upload channels opened in the transmission accessing and connecting module reach the maximum transmission rate. The criterion for determining that SFN is fully loaded or over loaded is that the transmission rates of the upload channels opened in the transmission accessing and connecting module all at the maximum transmission rate, and the data format analyzing and integrating module in SFN has a large amount of data to be uploaded.

The transmission accessing control module is configured to transmit the sensed data amount to be uploaded and the channel rate information of the transmission accessing and connecting module to the sensing resource control module, and forward upload rate control information of the transmission accessing and connecting module as well as the transmitting channel control information between SFN and EAN to the transmission accessing and connecting module, which are generated by the sensing resource control module.

Further, the actuators and the sensors of the Internet of Things are connected to SFN through wireless links such as Near Field Communication (NFC), Blue Tooth Low Energy (BLE) and Wireless Fidelity (Wi-Fi). the actuators and the sensors of the Internet of Things are connected to SFN through wired methods such as Universal Serial Bus (USB) and Ethernet.

Further, SFN is connected to the south wall of EAN gateway through wired links or wireless links. The south wall is configured to gather the data uploaded by nodes from down layers such as SFN. EAN equipped with edge computing functions performs edge computing on the data uploaded by SFN and then transmits the data to the north wall of the gateway. The north wall is configured to transmit the data after edge computing by EAN to the nodes from upper layers. The main connection mode between the north wall and the nodes of upper layers are optical fibers.

DETAILED DESCRIPTION OF THE EMBODIMENTS

The technical solutions of the present disclosure will be specifically clarified below in conjunction with the accompanying drawings.

Figure 1:
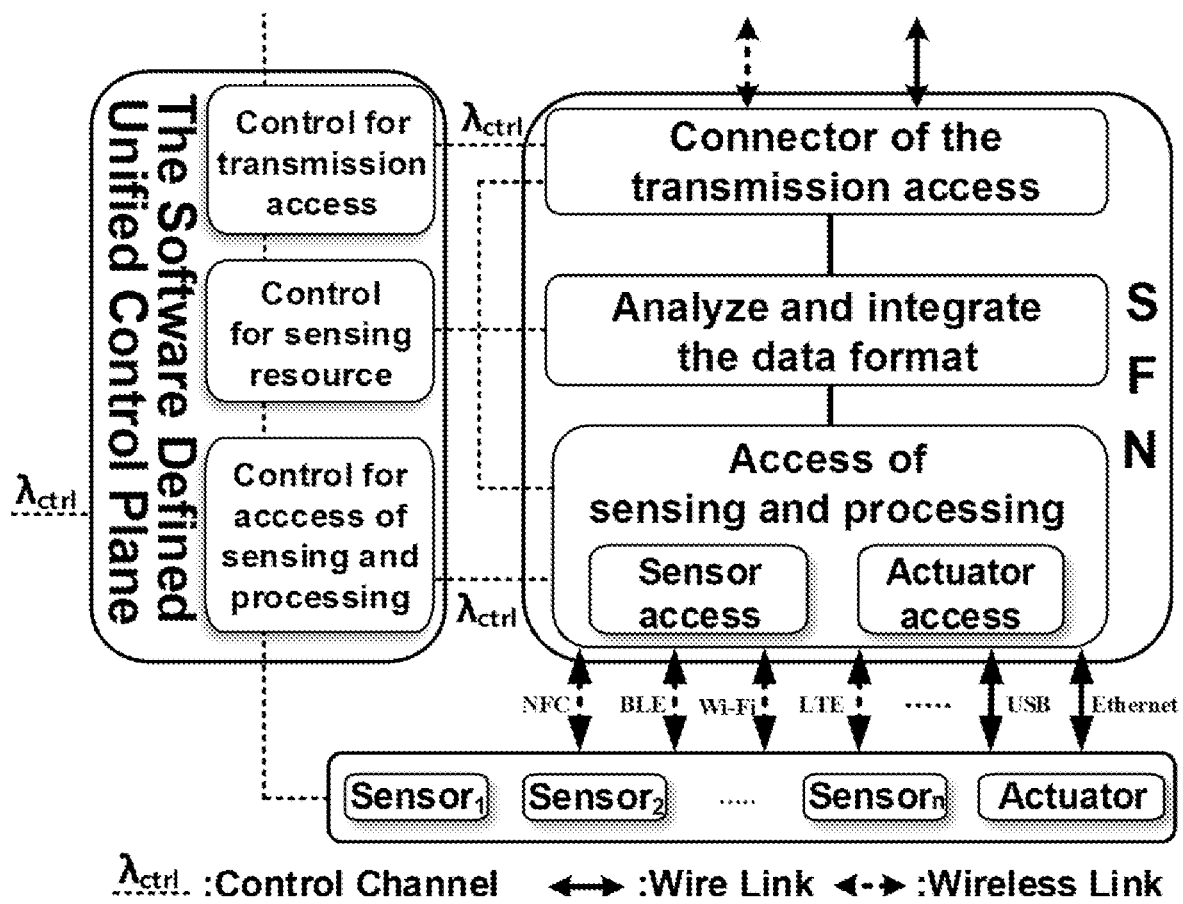
FIG. 1 illustrates a functional architecture diagram of SFN in the present disclosure.

As illustrated in FIG. 1, the sensing function control node for the Internet of Things proposed by the present disclosure includes the accessing module for the sensors and the actuators, the data format analyzing and integrating module and the transmission accessing and connecting module. The accessing module for the sensors and the actuators is configured to upload the data of the sensors and/or the actuators of the Internet of Things to the data format analyzing and integrating module. The data format analyzing and integrating module pre-processes the data that are uploaded by the accessing module for the sensors and the actuators, including data analysis and format integration. The transmission accessing and connecting module is configured to establish upload channels between SFN and EAN, and upload the pre-processed data to EAN. The accessing function of the sensors and the actuators of the Internet of Things connecting to SFN, the adjusting function of the upload rate of the accessing module for the sensors and the actuators, the adjusting function of the upload rate of the data format analyzing and integrating module, the adjusting function of the upload rate of the transmission accessing and connecting module and the adjusting function of the number of the channels opened in the transmission accessing and connecting module are implemented by the software-defined unified control plane.

The software-defined unified control plane includes the accessing control module for the sensors and the actuators, the sensing resource control module and the transmission accessing control module. The accessing control module for the sensors and the actuators is configured to send accessing control instructions to the sensors and the actuators on the physical layer, and transmit the sensed information of the data amount to be uploaded and the channel rate information of the accessing module for the sensors and the actuators to the sensing resource control module, and forward the upload rate control information of the accessing module for the sensors and the actuators generated by the sensing resource control module to the accessing module for the sensors and the actuators. The sensing resource control module is configured to sense the status information of the accessing module for the sensors and the actuators, the data format analyzing and integrating module as well as the transmission accessing and connecting module, determine the load status of SFN according to the sensed status information of modules in SFN and generate the upload rate control information of the modules in SFN and the transmitting channel control information between SFN and EAN. The transmission accessing control module is configured to transmit the sensed data amount to be uploaded and the channel rate information of the transmission accessing and connecting module to the sensing resource control module, and forward upload rate control information of the transmission accessing and connecting module as well as the transmitting channel control information between SFN and EAN generated by the sensing resource control module to the transmission accessing and connecting module.

Figure 3:
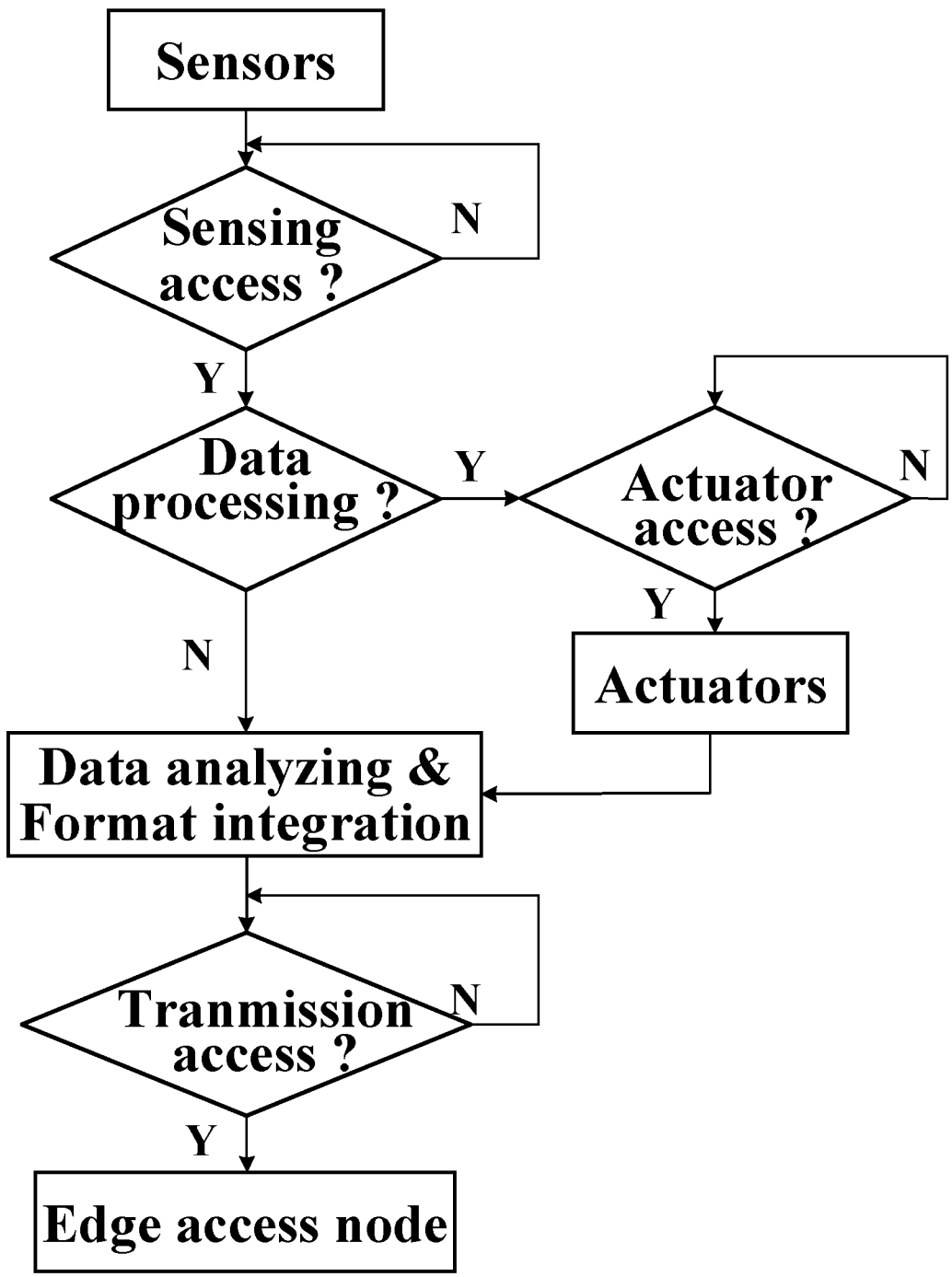
FIG. 3 illustrates a flowchart that the SFN uploads data sensed by a physical layer to an EAN in the present disclosure.

The process that SFN in the present disclosure uploads the data sensed by the physical layer to EAN is as illustrated in FIG. 3, which includes obtaining original sensing data from the Internet of Things, pre-processing the collected original sensing data of the Internet of Things and uploading the data after pre-processing to EAN.

The original sensing data from the physical world are sensed by the sensor 1 to sensor n which are located at the edges of the Internet of Things, and the actuators pre-process the original sensing data in the sensor 1 to the sensor n. In the case where merely the sensor i ($1 \leq j \leq n$)) obtains the sensor accessing permission instructions sent by the software-defined unified control plane, the sensor i transmits the sensed original sensing data to the accessing module for the sensors and the actuators of SFN through the wireless interfaces (such as NFC, BLE and Wi-Fi) or the wired interfaces (such as USB and Ethernet). In the case where the sensor i and the actuators obtain the accessing permission instructions sent by the software-defined unified control plane at the same time, the sensor i transmits the sensed data to the actuators firstly, the actuators pre-process the original sensing data, and then the actuators transmit the pre-processed data to the accessing module for the sensors and the actuators through the wireless interfaces (such as NFC, BLE and Wi-Fi) or wired interfaces (such as USB and Ethernet).

In the case where the data arrive at the data format analyzing and integrating module of SFN, the data enter the data processing queue for queuing, waiting for analysis and format integration. The processed original sensing data are called as the uplink data which are queued for transmission in the data format analyzing and integrating module. The accessing module for the sensors and the actuators, the data format analyzing and integrating module, and the transmission accessing and connecting module of SFN transmit the status information related to their own modules, such as the data amount to be uploaded and the channel rates, to the accessing control module for the sensors and the actuators, the sensing resource control module and transmission accessing control module of the software-defined unified control plane through the control channel $\lambda_{ctrl}$. The accessing control module for the sensors and the actuators transmits the collected data amount to be uploaded and the channel rates of the accessing module for the sensors and the actuators to sensing resource control module, the transmission accessing control module transmits the collected data amount to be uploaded and channel rate of the transmission accessing and connecting module to the sensing resource control module. Subsequently, the sensing resource control module sends different instructions to the accessing control module for the sensors and the actuators as well as the transmission accessing control module in the software-defined unified control plane according to the status information of the modules in SFN. In the case where the status information of the modules in SFN indicates that none transmission rates of the upload channels opened in the transmission accessing and connecting module reach the maximum transmission rate, the SFN module is under the light load, and the sensing resource control module sends instructions of increasing the upload rates of modules in SFN or reducing the number of the transmitting channels between SFN and EAN, such that reducing the power consumption of SFN and EAN. In the case where the status information indicates that the upload channels opened in the transmission accessing and connecting module are all at the maximum transmission rate and the data analyzing and integrating module in SFN has a large amount of data to be uploaded, the SFN module is fully loaded or over loaded, and the sensing resource control module sends instructions of increasing the number of the transmitting channels between SFN and EAN or decreasing the upload rate of modules in SFN, thereby avoiding the congestion of the transmitting channels between SFN and EAN due to the data accumulations. By controlling the number of the channels between the sensors and EAN through SFN, the uplink rate of data can be effectively controlled and the packet loss rate of data can be reduced.

The uplink data from the sensors and the actuators of the Internet of Things are transmitted to EAN through different transmission interfaces (wired interfaces or wireless interfaces) at different transmission rates according to transmission access instructions with different demands, thus avoiding the accumulations of uplink data in the data format analyzing and integrating module of SFN, avoiding packet loss when the sensors and the actuators upload the original sensing data, and avoiding congestion in the transmission accessing and connecting channel.

Figure 2:
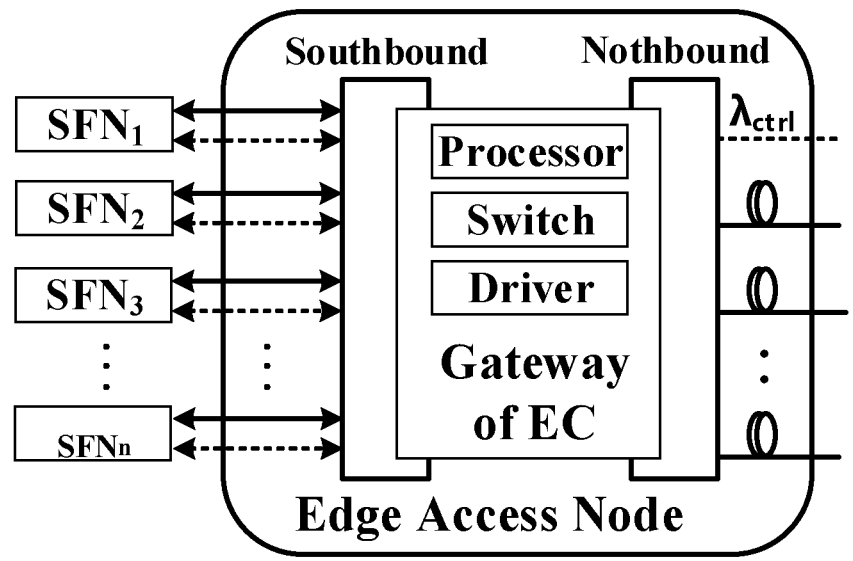
FIG. 2 illustrates an architecture diagram of SFN connected to EAN in the present disclosure.

After the uplink data transmitted through the transmission accessing and connecting module arrive at EAN, the data are mined, processed, and stored in EAN, which is convenient for data exchanges between different EANs and transmissions to nodes of upper layers. As illustrated in FIG. 2, SFN can be connected to EAN through the wired or the wireless links, and connected to the south wall of EAN gateway. Specifically, the gateway of EAN is divided into a south wall and a north wall, the south wall is configured to aggregate and access the underlying data, and the accesses can be divided into two kinds of wired or wireless links; and the north wall is mainly responsible for the connections between EAN and the nodes of upper layers, and the main connection mean is optical fibers. And EAN are equipped with certain edge computing functions, so the corresponding drivers, actuators and memories should be designed.

The present disclosure adopts the above technical solutions, and has the following beneficial effects.

(1) The sensing function control node for the Internet of Things proposed by the present disclosure is located between the Internet of Things edges and the Internet of Things access layer. The sensing function control node for the Internet of Things starts to pre-process the original sensing data at the physical layer of the Internet of Things, thereby reducing the pressure of node mining and processing a large amount of multi-source heterogeneous data in the Internet of Things access layer.

(2) The sensing function control node for the Internet of Things proposed by the present disclosure utilizes the software-defined optical access technology to sense in real time the rate at which the Internet of Things uploads original sensing data and the rate at which the modules in the control node uploads data, thereby obtaining the load status of the sensing function control node for the Internet of Things. By controlling the original sensing data access rate, the upload rate of pre-processed data as well as the number of upload channels between the sensing function control node for the Internet of Things and EAN, alleviating the aggregations and the storage pressures of the nodes of upper layers.

(3) The sensing function control node for the Internet of Things proposed by the present disclosure increases the upload channels which are connected with EAN and improves the data upload rate in a case where the sensing load at the sensing function control node for the Internet of Things is relatively low, such that the data at the Internet of Things can quickly and efficiently access and aggregate to the Internet of Things access layer. In a case where the sensing function control node for the Internet of Things is sensed fully loaded or over loaded, the control node decreases the upload channels which are connected with EAN and reduces the data uploaded rate, thereby reducing the packet loss rate in the process for transmitting the original sensing data in the Internet of Things to Internet of Things access node, and improving the accuracy and reliability of the data aggregated into the Internet of Things access layer.

The above are merely the specific embodiments of the present disclosure. It should be noted that for an ordinary person skilled in the art, several improvements and embellishments can be made without departing from the principles of the present disclosure, and these improvements and embellishments should also be considered as the protection scope of the present disclosure. All components not explicitly defined in the embodiments can be implemented by using the prior art.

What is claimed is:

1. A sensing function control node for an Internet of Things, wherein the node comprises:

an accessing module for the sensors and the actuators, configured to receive data uploaded by the sensors and the actuators of the Internet of Things, and transmit the received data to a data analyzing and integrating module, according to upload rate control information of the accessing module for the sensors and the actuators;

a data format analyzing and integrating module, configured to receive data uploaded by the accessing module for the sensors and the actuators, pre-process the received data, and transmit the pre-processed data to a transmission accessing and connecting module according to upload rate control information of the data format analyzing and integrating module; and the transmission accessing and connecting module, configured to receive the pre-processed data uploaded by the data analyzing and integrating module, open channels for uploading the pre-processed data according to transmitting channel control information between the control node and an edge accessing node, and adjust transmitting rates for transmitting the pre-processed data to the edge accessing node according to upload rate control information of the transmission accessing and connecting module, wherein the upload rate control information of the accessing module for the sensors and the actuators, the upload rate control information of the data format analyzing and integrating module, the upload rate control information of the transmission accessing and connecting module, and the transmitting channel control information between the control node and the edge accessing node are generated by a software-defined unified control plane; the software-defined unified control plane is configured to obtain in real time a data amount to be uploaded and a channel rate of the accessing module for the sensors and the actuators, a data amount to be uploaded and a channel rate of the data format analyzing and integrating module, as well as a data amount to be uploaded and a channel rate of the transmission accessing and connecting module, and obtain a load status of the control node, and generate upload rate control information of modules in the control node and the transmitting channel control information between the control node and the edge accessing node according to the load status of the control node.

2. The sensing function control node for the Internet of Things according to claim 1, wherein the software-defined unified control plane includes:

an assessing control module for the sensors and the actuators, configured to transmit assessing control instructions to the sensors and the actuators of the Internet of Things, receive the data amount to be uploaded and the channel rate of the accessing module for the sensors and the actuators, forward the data amount to be uploaded and the channel rate of the accessing module for the sensors and the actuators to a sensing resource control module, receive the upload rate control information of the accessing module for the sensors and the actuators fed back by a sensor origin control module, and forward the upload rate control information of the accessing module for the sensors and the actuators to the accessing module for the sensors and the actuators;

the sensing resource control module, configured to receive the data amount to be uploaded and the channel rate of the data format analyzing and integrating module, transmit the upload rate control information of the data format analyzing and integrating module to the data format analyzing and integrating module, and sense the load status of the control node, according to the data amount to be uploaded and the channel rate of the accessing module for the sensors and the actuators, the data amount to be uploaded and the channel rate of the data format analyzing and integrating module, as well as the data amount to be uploaded and the channel rate of the transmission accessing and connecting module; generate control information that is used for increasing an upload rate of the accessing module for the sensors and the actuators, an upload rate of the data format analyzing and integrating module, as well as an upload rate of the transmission accessing and connecting module, or generate control information that is used for reducing a number of transmitting channels between the control node and the edge accessing node, in a case where the control node is under a light load; generate control information that is used for decreasing the upload rate of the accessing module for the sensors and the actuators, the upload rate of the data format analyzing and integrating module, as well as the upload rate of the transmission accessing and connecting module, or generate control information that is used for increase the number of the transmitting channels between the control node and the edge accessing node, in a case where the control node is fully loaded or over loaded; and a transmission accessing control module, configured to receive the data amount to be uploaded and the channel rate of the transmission accessing and connecting module, forward the data amount to be uploaded and the channel rate of the transmission accessing and connecting module to the sensing resource control module, receive the upload rate control information of the transmission accessing and connecting module fed back by the sensing resource control module and the transmitting channel control information between the control node and the edge accessing node, forward the upload rate control information of the transmission accessing and connecting module and the transmitting channel control information between the control node and the edge accessing node to the transmission accessing and connecting module.

3. The sensing function control node for the Internet of Things according to claim 2, wherein a criterion for determining the control node being under the light load is that none transmitting rates of transmitting channels opened in a transmission accessing and connecting module reaches a maximum transmitting rate.

4. The sensing function control node for the Internet of Things according to claim 2, wherein a criterion for determining the control node being fully loaded or over loaded is that transmitting rates of transmitting channels opened in a transmission accessing and connecting module all at a maximum transmitting rate, and the data analyzing and integrating module in SFN has a large amount of data to be uploaded.

5. The sensing function control node for the Internet of Things according to claim 2, wherein in a case where the assessing control instructions merely allow the sensors to access, original sensing data in sensors that are allowed to access are uploaded to the accessing module for the sensors and the actuators.

6. The sensing function control node for the Internet of Things according to claim 2, wherein in a case where the assessing control instructions allow the sensors and the actuators to access, the accessing control instructions further include information on whether original sensing data in sensors that are allowed to access need to be processed by the actuators, the original sensing data in the sensors that do not need to be processed by the actuators are uploaded to the accessing module for the sensors and the actuators, and the original sensing data in the sensors that need to be processed by the actuators are uploaded to the accessing module for the sensors and the actuators after processing.

7. The sensing function control node for the Internet of Things according to claim 1, wherein the control node connects the sensors and the actuators of the Internet of Things through a wired link or a wireless link.

8. The sensing function control node for the Internet of Things according to claim 1, wherein the control node connects the edge accessing node through a wired link or a wireless link.

9. The sensing function control node for the Internet of Things according to claim 7, wherein the wired link is a serial universal interface or Ethernet; and the wireless link is a near-field communication, a Bluetooth, or a wireless local area network.

* * * * *

UNITED STATES PATENT AND TRADEMARK OFFICE
CERTIFICATE OF CORRECTION

PATENT NO. : 12,273,416 B1  
APPLICATION NO. : 18/574038  
DATED : April 8, 2025  
INVENTOR(S) : Xiaohan Sun et al.

Page 1 of 1

It is certified that error appears in the above-identified patent and that said Letters Patent is hereby corrected as shown below:

On the Title Page

Item (72) Inventors should read: Xiaohan Sun, Jiangsu (CN); Xiaokai Ye, Jiangsu (CN); Kun Huang, Jiangsu (CN); Tao Lyu, Jiangsu (CN); Jun Zhao, Jiangsu (CN); Qiugun Miao, Jiangsu (CN); Jinhui Li, Jiangsu (CN); Xuekang Shan, Jiangsu (CN)

Signed and Sealed this  
Fifth Day of August, 2025

Coke Morgan Stewart  
*Acting Director of the United States Patent and Trademark Office*